July 24, 1951  F. J. ROSS  2,561,675
LINE GUIDE FOR FISHING RODS
Filed June 11, 1946

INVENTOR
Frank J. Ross

BY Hauke & Hardesty
ATTORNEYS

Patented July 24, 1951

2,561,675

UNITED STATES PATENT OFFICE 2,561,675

LINE GUIDE FOR FISHING RODS

Frank J. Ross, Detroit, Mich.

Application June 11, 1946, Serial No. 675,907

1 Claim. (Cl. 43—24)

The present invention relates to line guides for fishing rods and has among its objects a guide that is easily and quickly affixed to or removed from a rod for replacement.

Another object is a guide that is provided with an eyelet that is easily and quickly replaceable when desired.

Still another object is a guide consisting of an eyelet and means for holding the eyelet in floating relation.

Other objects and advantages will readily occur to those skilled in the art upon reference to the following description and the accompanying drawings in which Fig. 1 is a perspective view of a portion of a fishing rod with a line guide, made according to the present invention, in place.

Figure 1:
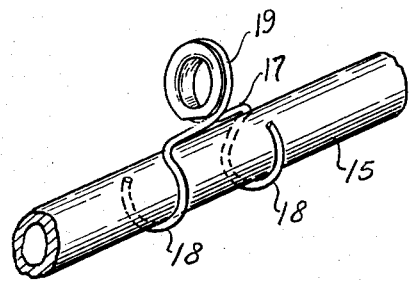
Figure 2:
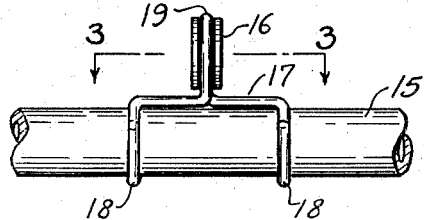
Fig. 2 is a side elevation of the same.
Figure 3:
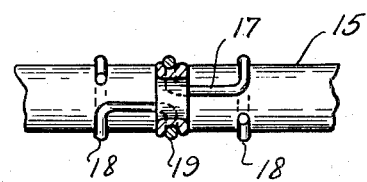
Fig. 3 is a sectional view on line 3—3 of Fig. 2.
Figure 4:
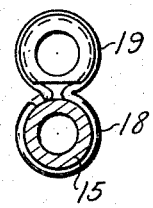
Fig. 4 is an end view of the guide.

In the drawings, a portion of a tubular metal fishing rod is shown at 15 and on the rod is shown a line guide made in accordance with the present invention, it being understood that as many of such guides may be used as found desirable or necessary.

Figure 5:
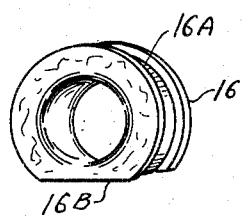
Fig. 5 is an enlarged perspective view of an eyelet.
Figure 6:
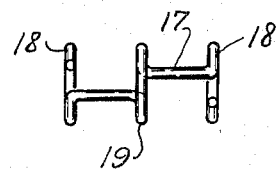
Fig. 6 is a top view of the eyelet holder.

The guide of Figs. 1 to 6 comprises an eyelet 16 such as is shown in Fig. 5. This consists of a ring provided with a peripheral groove 16A and also flattened at one side as indicated at 16B. The eyelet 16 is held in a suitable wire holder 17 of the form shown which holder consists of a suitable metal wire, preferably of "stainless" steel, having its ends formed into single incomplete rings 18 lying in parallel planes and coaxial.

The central portion of the wire is formed into an open loop 19 which lies in a plane parallel to the planes of loops 18 but whose axis is displaced laterally so that when the rod 15 is in the loops 18, the loop 19 stands out therefrom as shown. The loop 19 with the eyelet 16 in place lies in the peripheral groove 16A and holds the eyelet firmly but allows the latter a small floating movement, the latter movement being permitted by the flat 16B. The flat 16B constitutes a chord of a removed segment, the chord being of a length not less than the radius of the outer circumference of the eyelet 16.

In forming the holder 17, the loops 18 are left incomplete as shown in order to make the holder adaptable to a range of rod sizes while the open loop 19 of course permits the ready replaceability of the eyelet.

I claim:

In a line guide for fishing rods, a circular eyelet having a small segment removed from its peripheral portion and having a peripheral groove, and a holder therefor consisting of a wire having its central portion formed into a circular loop adapted to embrace said eyelet and lie in said groove, said eyelet and loop being spaced from each other in the region of said removed segment, said wire having its ends formed to provide means for attachment of said holder to a fishing rod and said segment being defined by a chord of a length not length than the radius of the outer circumference of the eyelet.

FRANK J. ROSS.

REFERENCES CITED

The following references are of record in the file of this patent:

UNITED STATES PATENTS

| Number | Name | Date |
| --- | --- | --- |
| 682,730 | Mitchell | Sept. 17, 1901 |
| 734,544 | Hall | July 28, 1903 |
| 911,119 | Farr | Feb. 2, 1909 |
| 958,775 | Shakespeare | May 24, 1910 |
| 1,473,437 | Lindstrom | Nov. 6, 1923 |
| 1,923,263 | Heddon | Aug. 22, 1933 |
| 2,164,803 | Duraffourg | July 4, 1939 |

FOREIGN PATENTS

| Number | Country | Date |
| --- | --- | --- |
| 8,980 | Great Britain | of 1907 |
| 12,828 | Great Britain | June 5, 1902 |